(12) United States Patent
Liu et al.

(10) Patent No.: US 8,175,382 B2
(45) Date of Patent: May 8, 2012

(54) LEARNING IMAGE ENHANCEMENT

(75) Inventors: Zicheng Liu, Bellevue, WA (US); Cha Zhang, Sammamish, WA (US); Zhengyou Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1023 days.

(21) Appl. No.: 11/801,620

(22) Filed: May 10, 2007

(65) Prior Publication Data
US 2008/0279467 A1 Nov. 13, 2008

(51) Int. Cl.
*G06K 9/00* (2006.01)
(52) U.S. Cl. ........ 382/167; 382/160; 382/162; 382/254; 382/272; 382/274
(58) Field of Classification Search .......... 382/155–167, 382/254, 270–275
See application file for complete search history.

(56) References Cited

U.S. PATENT DOCUMENTS

| | | | |
|---|---|---|---|
| 5,327,228 A * | 7/1994 | Satyanarayana et al. ..... | 348/647 |
| 5,828,779 A | 10/1998 | Maggioni | |
| 6,678,407 B1 * | 1/2004 | Tajima .......................... | 382/167 |
| 6,803,954 B1 | 10/2004 | Hong et al. | |
| 6,909,451 B1 | 6/2005 | Latypov et al. | |
| 7,084,881 B1 * | 8/2006 | Chen et al. ..................... | 345/589 |
| 7,348,992 B2 * | 3/2008 | Kim et al. ...................... | 345/589 |
| 7,782,378 B2 * | 8/2010 | Zhang et al. .................. | 348/241 |
| 7,945,113 B2 * | 5/2011 | Hayaishi ....................... | 382/167 |
| 2002/0146178 A1 | 10/2002 | Bolle et al. | |
| 2004/0012613 A1 | 1/2004 | Rast | |
| 2004/0218827 A1 | 11/2004 | Cohen et al. | |
| 2005/0237952 A1 | 10/2005 | Punj et al. | |
| 2006/0244819 A1 | 11/2006 | Pun et al. | |
| 2007/0139515 A1 * | 6/2007 | Du Breuil .................. | 348/14.01 |

FOREIGN PATENT DOCUMENTS
WO WO0118665 A1 3/2001
WO WO2007007257 1/2007

OTHER PUBLICATIONS

Jie Yang, Weier Lu and Alex Waibel, "Skin-Color Modeling and Adaptation", Lecture Notes in Compute Science, vol. 1352/1997, 1997, pp. 687-694.*

Arvind Nayak and Subhasis Chaudhuri, "Self-Induced Color Correction for Skin Tracking Under Varying Illumination", International Conference on Image Processing Proceedings, vol. 2, 2003, pp. III-1009-III-1012.*

Erik Reinhard, Michael Ashikhmin, Bruce Gooch and Peter Shirley, "Color Transfer Between Images" IEEE Computer Graphics and Applications, Sep./Oct. 2001, pp. 34-41.*

(Continued)

*Primary Examiner* — Matthew Bella
*Assistant Examiner* — Eric Rush
(74) *Attorney, Agent, or Firm* — Lee & Hayes, PLLC (57) ABSTRACT

Image enhancement techniques are described to enhance an image in accordance with a set of training images. In an implementation, an image color tone map is generated for a facial region included in an image. The image color tone map may be normalized to a color tone map for a set of training images so that the image color tone map matches the map for the training images. The normalized color tone map may be applied to the image to enhance the in-question image. In further implementations, the procedure may be updated when the average color intensity in non-facial regions differs from an accumulated mean by a threshold amount.

20 Claims, 4 Drawing Sheets

OTHER PUBLICATIONS

Cuizhu Shi, Keman Yu, Jiang Li and Shipeng Li, "Automatic image Quality Improvement for Videoconferencing", IEEE International Conference on Acoustics, Speech and Signal Processing, May 2004, pp. III-701-III-704.*

Lin, et al., "Implementation of H.323 Compliant Virtual Meeting Systems", available at least as early as Feb. 21, 2007, at <<http://www.cs.ccu.edu.tw/~cwlin/pub/icsvmeeting.pdf>>, pp. 1-8.

Messina, et al., "Image Quality Improvement by Adaptive Exposure Correction Techniques," IEEE International Conference on Multimedia and Expo (ICME), Amsterdam, The Netherlands, Jul. 2003, pp. 549-552.

Qiu, "From Content-based Image Retrieval to Example-based Image Processing," University of Nottingham Technical Report: Report-cvip-May 2004, pp. 4.

Reinhard, et al., "Color Transfer between Images," IEEE Computer Graphics and Applications, Sep./Oct. 2001, pp. 34-41.

Saitoh, "Image Contrast Enhancement Using Genetic Algorithm," IEEE International Conference on SMC, Amsterdam, The Netherlands, Oct. 1999, pp. 899-904.

Shi, et al., "Automatic Image Quality Improvement for Videoconferencing," IEEE International Conference on Acoustics, Speech, and Signal Processing (ICASSP), May 17-21, 2004, pp. 701-704.

SightSpeed—World's Best Video Chat, Video Mail, and Video Conferencing Services, retrieved from the Internet http://www.sightspeed.com, May 10, 2007, 1 page.

Toelg, et al., "Towards an Example-Based Image Compression Architecture for Video-Conferencing", available at least as early as Feb. 21, 2007, at <<http://dspace.mit.edu/bitstream/1721.1/6632/2/AIM-1494.pdf>>, Massachusetts Institute of Technology, 1994, pp. 1-37.

Viola, et al., "Robust Real-time Object Detection," Second International Workshop on Statistical and Computational Theories of Vision—Modeling, Learning, Computing, and Sampling, Vancouver, Canada, Jul. 2001, pp. 1-25.

Wu, et al., "Transporting Real-Time Video over the Internet: Challenges and Approaches", available at least as early as Feb. 21, 2007, at <<http://www.ittc.ku.edu/~jgauch/cgi-bin/library/papers/Wu.2000b.pdf>>, IEEE, vol. 88, No. 12, 2000, pp. 1855-1875.

Bhukhanwala, et al., "Automated Global Enhancement of Digitized Photographs," IEEE Transactions on Consumer Electronics, 40(1), 1994, pp. 1-10.

Farin, "Curves and surfaces for CAGD: A practical guide," Academic Press, 1993.

Fraser, "Stage Lighting Design: A practical Guide," Crowood Press, 2000.

* cited by examiner

LEARNING IMAGE ENHANCEMENT

BACKGROUND

Generating high quality video and images usually requires extensive preparations to insure that the end image is visually appealing. The television and film industries often employ extensive preparations to generate high quality images. Often these preparations include carefully designed lighting which will generate an appealing image.

These precautions generally are not practical for most video and image applications. While video conferencing is increasingly popular, image problems persist in comparison to high quality film and television images. For example, low light or back light may result in poor video images.

In particular, most humans are quite perceptive at detecting image issues related to human facial features and color tone issues. Thus, poor light or lighting changes may result in "washed out" or pale facial features (color tone issues) and other image issues. In video conferencing situations, the lighting and other environmental factors may result in poor image quality. For example, poor lighting, changes in lighting, or changes in orientation and position of an object of interest (e.g., a person changing position with respect to the camera or lighting) may impact the image quality and the image color tone. In comparison to brightness and contrast, color tone perception is generally more subjective to viewer preferences.

Correspondingly, still images are subject to similar difficulties. For example, poor lighting may result in a pale image or poor color tone. The increasing popularity of digital cameras may result in more images being captured in less than ideal conditions. Furthermore, cell phones and smart phones have increased the popularity of obtaining images. Multi-tasking devices such as smart phones may tradeoff performance to provide multiple capabilities. For example, a smart phone camera may have lower performance characteristics than a dedicated camera device. These developments may increase the number of non-ideal images.

SUMMARY

Image enhancement techniques are described to enhance an image in accordance with a set of training images. In an implementation, an image color tone map is generated for a facial region included in an in-question image. The image color tone map may be normalized to a color tone map for a set of training images so that the image color tone map matches a map for the training images. The normalized color tone map may be applied to the image to enhance the in-question image. In further implementations, the procedure may be updated when the average color intensity in non-facial regions differs from an accumulated mean by a threshold amount.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques are described for implementing learning image enhancement. According to these techniques, a facial region color tone map may be generated by analyzing the facial region of an image. For example, the facial region may include one or more subjects and may include non-human subjects. A set of training images may be used for normalizing the image color tone map. For example, the image color tone map is normalized to the color tone map for the set of training images. Thus, the original image may be enhanced by applying the normalized color tone map. In video situations, the procedure may be updated for subsequent images when the intensity in other image region(s) varies beyond a desired threshold. For example, the procedure may be initiated when the lighting changes in a video. A variety of other implementations are also contemplated, further discussion of which may be found in the following discussion.

In comparison to brightness and contrast, color tone may be observer subjective. In addition, while brightness and contrast are generally quantifiable, color tone issues generally may have escaped quantification and analysis. As a result, the present discussion will generally address color tone issues commonly identified as detracting from the image or being generally considered unpleasant to a portion of the population based on statistical evaluation.

In the following discussion, an exemplary environment is first described that is operable to implement learning image enhancement. Exemplary procedures are then described that may be employed in the exemplary environment, as well as in other environments.

Exemplary Environment

Figure 1:
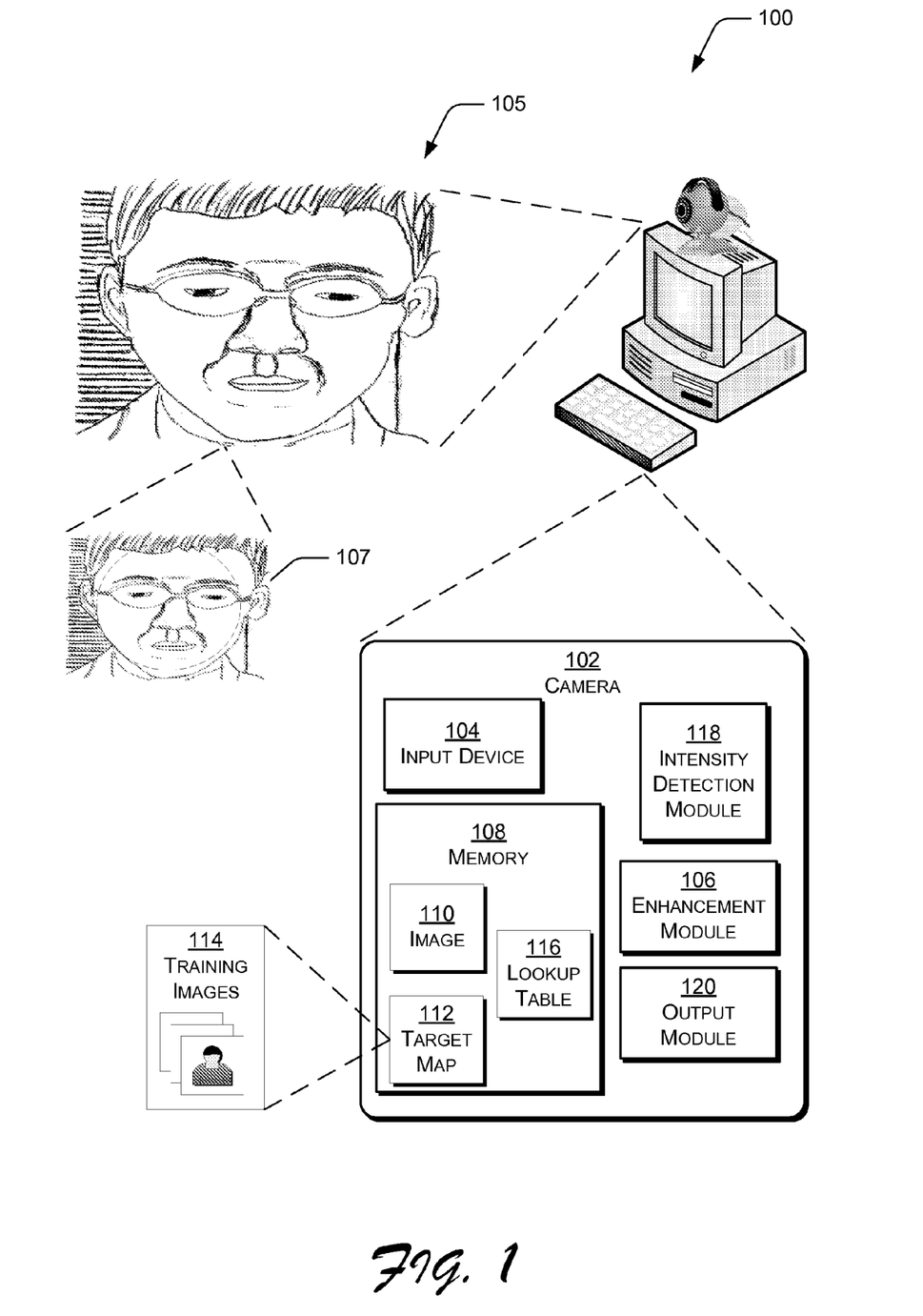
FIG. 1 is an illustration of an environment in an exemplary implementation that is operable to implement learning image enhancement.

FIG. 1 is an illustration of an environment 100 in exemplary implementations employing learning-based image enhancement. While a video camera 102 is discussed, as an example of a physical device for capturing an image of a subject, other suitable physical devices include, but are not limited to, cameras, video conferencing cameras, webcams, computers, and so on. For example, a computer may enhance an image received from an associated webcam.

An input device 104 may be included in the camera 102 to capture an image 105. For example, the input device may include a light sensitive detector, for generating a video. While in the instant case, the input device 104 is discussed as capturing a video including an image (e.g., a frame) having a facial region 107 (for illustrative purposes an oval is discussed), in other implementations the image is a "still" or single frame image.

An enhancement module 106 may be included in the video camera 102. In these implementations, the enhancement module 106 may generate an image color tone map. For example, the enhancement module 106 generates a color tone map for the facial region 107 included in the image or frame. While the present implementation discusses a per pixel color tone map, sampling techniques and other statistical techniques are available. Sampling or other statistical techniques may be used to minimize central processing unit time and processing capacity as desired. In further implementations, if multiple facial regions are detected, the system may statistically analyze the various facial regions, select a predominate facial region, or so on.

In some implementations, the input device 104 may forward the image to the enhancement module 106. In other implementations, the enhancement module 106 may retrieve the image from memory 108, receive the image over a network, and so on as desired. The image may be a frame included in an image file 110 (video) maintained in memory 108. For example, a computer receives a frame from a real-time web conference for image enhancement.

The enhancement module 106 may generate a color tone map for a facial region included in the image. For example, the enhancement module 106 detects the facial region based on shape, combination of shapes, facial features, color tone, edge analysis, and so on. In further implementations, a dedicated module may identify the facial region within the image. For the present discussion, but without limiting possible implementations, the facial region may be generally considered as an area encompassing the facial features (e.g., eyes, nose, cheeks, ears, and forehead) included in the image.

For video implementations, the enhancement module 106 may generate a color tone map based on a three color channel basis. An image color tone map may be generated for a red channel, a green channel and a blue channel (RGB). For a pixilated image, the resultant display or captured image portion may be considered a composite of the three component color channels. Thus, the red, green and blue color channels may form a pixel included in an image. Various color channel combinations may be used with the systems and techniques discussed herein. In the present implementation, the image color tone map is applied on a per channel basis for the color channels forming the image.

The enhancement module 106 may match the image to the color tone map 112 for a set of training images 114 based on statistics generated for the colors within the facial region. For example, the enhancement module 106 determines the mean and standard deviation for the pixels included in the facial region of the in-question image for comparison with the color tone map 112 for the training images 114. In this way, the enhancement module 106 may normalize the image color tone map to a target color tone map 112 for a set of training images. The normalized map (e.g. the image color tone map now normalized to the target color tone map for the set of training images) may be applied to the image so the image color statistic match that of the target color tone map for the set of training images. In the present case, the determination is made on a per color channel basis for a red color channel, a green color channel, and a blue color channel. In further implementations, sampling and other statistical techniques may be used to minimize processing overhead.

In the current implementation, the training images 114 are selected based on the individual training image's perceived image quality. For example, professionally obtained images may be selected, for inclusion in the training image set, as the environmental factors may be tailored to generate a "pleasing image" or an image which is tailored in an attempt to accurately represent the subject matter. Thus, while the particular subject (e.g., a human model) may vary, the training images 114 may be selected based on the individual image's perceived qualities (i.e., an "idealized image"). For example, an individual image is selected because the environmental factors produce an image that accurately represent the subject.

Training images 114 may encompass subjects having different skin tones and pigmentations obtained under "stage quality" or highly tailored lighting conditions. Thus, a set of training images 114 may include people with different ethnic origins, levels of pigmentation, and so on, so that, the set is generally applicable to the population at large. The particular subjects may not represent a particular class of skin tones. Larger sample sets may be desired if less than idealized images are used. For example, the larger sample sets (in comparison to idealized images) may minimize environmental lighting factors.

In implementations, a color tone map for a set of training images (or target map 112) may be obtained by determining the mean and standard deviation for the pixels in the facial region for the individual images included in the training set 114. In other implementations, non-facial regions may be considered as well. Generally, the color distribution within a facial region forms a Gaussian model. Given an individual image from the training/target set, it may be represented by a vector (for a three color channel system, respectively, colors 1, 2 and 3)

$$v_i = (m_1^i, m_2^i, m_3^i, \sigma_1^i, \sigma_2^i, \sigma_3^i)^T$$

in which "m" is the mean and "σ" is the standard deviation of the color of all pixels within the facial region, "T" indicates the vector is transposed. Given "n" training images, we have "n" such vectors, $\{v_i | 1 \leq i \leq n\}$. The distance between any two vectors $v_i$ and $v_k$ ($1 \leq i, k \leq n$), denoted by $D(v_i, v_k)$, can be simply $\|v - v_k\|$. Mahalanobis Distances may also be used. The standard k-means algorithm is used to divide the "n" vectors into "M" clusters/classes. The center of each cluster j, j=1, . . . ,M, is denoted by $$\bar{v}_j = (\bar{m}_1^j, \bar{m}_2^j, \bar{m}_3^j, \bar{\sigma}_1^j, \bar{\sigma}_2^j, \bar{\sigma}_3^j)^T$$

Given an input image in a system processing three color channels, compute the color vector $$v = (m_1, m_2, m_3, \sigma_1, \sigma_2, \sigma_3)^T$$

in which the mean and standard deviation of the three color channels in the facial region. To find which cluster in the training set is the target for color tone mapping for this input image, compute the distances, $D_j(v)$, between "v" and "$\bar{v}_j$", i.e., $\|v - \bar{v}_j\|$, and choose the cluster that has the smallest distance as the target. In which, Mahalanobis Distances may also be used. In another embodiment, distances, $D_i(v)$, between "v" and each of the training vectors "$v_i$" ($1 \leq i \leq n$) are computed, and the vector "$v_i$" that has the smallest distance is assigned as the target. In the following, presuming the target has the following vector:

$$\bar{v} = (\bar{m}_1, \bar{m}_2, \bar{m}_3, \bar{\sigma}_1, \bar{\sigma}_2, \bar{\sigma}_3)^T$$

In this fashion, the generated image color tone map may be normalized to the color tone map 112 for the training images. For example, normalization may include deriving a color tone mapping function so that the image matches the target color tone map 112 (i.e., the target distribution for the set of training images). This may be done on a per color channel basis. The normalized color tone map may be stored as a lookup table 116 which is used for subsequent images or frames. For example, the normalized color tone map is used until room lighting varies beyond a set threshold or level, based on an accumulated mean average intensity change. For instance, the room color intensity changes beyond a threshold in comparison to an accumulated historical mean for a video sequence.

For a three color channel system, normalization may use a mapping function in order to map the average intensity. Thus, for the mapping function, $$y = f_c(x)$$

for color channels "c, c=1, 2, 3" the average intensity may be mapped from $m_c$ to $\overline{m}_c$, such that "$f_c(x)$" satisfies the function, $$f_c(m_c) = \overline{m}_c$$

For the image color tone map standard deviation "$\sigma_c$" to match the training set standard deviation "$\overline{\sigma}_c$" (that is, for the contrast of the mapped image to match the contrast of the target color tone map), we set the first derivative of "$f_c(x)$" at "$\overline{m}_c$" to $$\text{"}\frac{\overline{\sigma}_c}{\sigma_c}\text{"}$$

(the target standard deviateion divided by the image color tone map standard deviation). Thus, $$f'_c(m_c) = \frac{\overline{\sigma}_c}{\sigma_c}$$

Assuming the dynamic range of the original image in consideration is [L, U] and the dynamic range of the mapped image is expected to full, i.e., [0, 255], then the function "$f_c(x)$" needs to satisfy $f_c(L)=0$ and $f_c(U)=255$. In the following, we assume L=0 and U=255, and we have $f_c(0)=0$ $$f_c(255) = 255$$

Here we assume that the maximum intensity value for the RGB scheme is 255 (i.e., 8 bit images). The following function "$f_c(x)$" is one that satisfy all the above constraints:

$$f_c(x) = \max\left(255, \min\left(0, \frac{\overline{\sigma}_c}{\sigma_c}(x - m_c) + \overline{m}_c\right)\right)$$

One drawback with this function is that it becomes quickly saturated at the low and high intensities. To overcome this issue, a piecewise cubic spline that satisfy the previously mentioned constraints as well as the following additional constraints placed on the derivatives of "$f'_c(0)$" and "$f'_c(255)$" may be used:

$$f'_c(0) = 0.5 * \frac{\overline{m}_c}{m_c}$$

$$f'_c(255) = 0.5 * \frac{255 - \overline{m}_c}{255 - m_c}$$

Such a fitted spline avoids quick saturation at the low and high intensities.

The enhancement module 106 may form an enhanced image by applying the normalized color tone map to the original image. For example, the mapping function is applied to the original image including non-facial regions.

In further implementations, an output module 120 is included for receiving the enhanced image for output. Outputting the image may include presenting the enhanced image, communicating the image over a network, storing the image in memory 108, printing the image and so on. For example, the enhanced image may be transferred over the Internet as part of a web chat. The normalized color tone map may be stored in memory 108 for use with subsequent images or frames. For example, the mapping function may be stored in a lookup table for subsequent images In a video sequence.

In further implementations, an intensity detection module 118 is included to detect intensity variations within subsequent images. When a sufficient intensity change occurs, the detection module 118 may request an updated color tone map. Exemplary changes may include, but are not limited to, lighting changes, camera movement, application of gain control, subjects moving, and so on. For instance, a person turning a light on may change the color intensity of the image including non-facial regions. Thus, the intensity detection module 118 may determine the desirability of updating the normalized color tone map. For example, the mapping function may be updated when the average intensity in a non-facial region differs from the accumulated intensity mean by an amount greater than a designated threshold.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable media, memory devices, e.g., memory. The module may be formed as hardware, software, a hybrid of hardware and software, firmware, stored in memory, as a set of computer readable instructions embodied in electronically readable media, etc.

Exemplary Procedures

The following discussion describes color tone enhancement procedures that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In the case of computer executable instructions, program code can be stored in one or more computer readable media, memory devices, e.g., memory. The module implemented in the procedures may be formed as hardware, software, a hybrid of hardware and software, firmware, stored in memory, as a set of computer readable instructions embodied in electronically readable media, etc. A variety of other examples are also contemplated.

Figure 2:
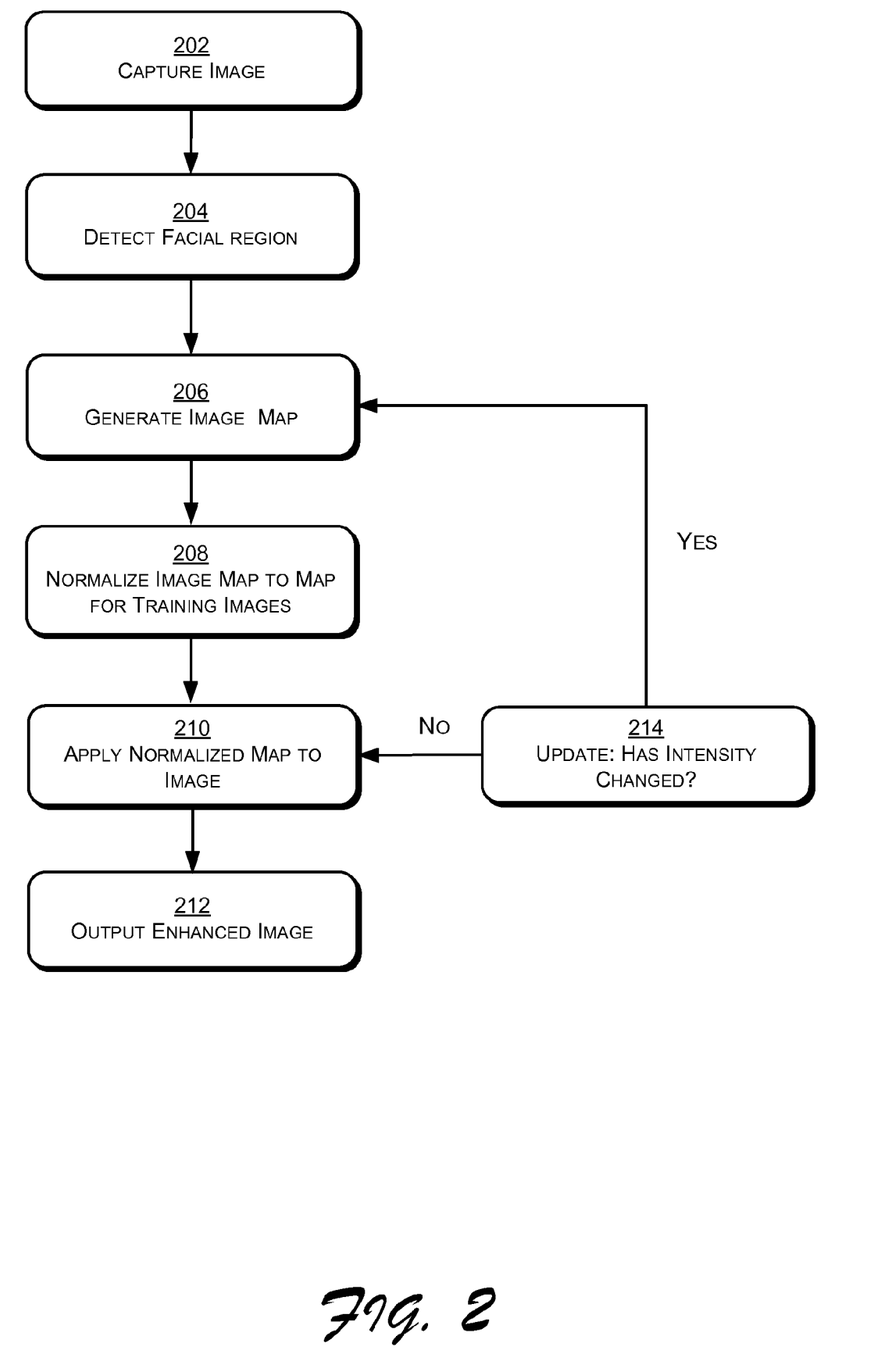
FIG. 2 is a flow diagram depicting a procedure in an exemplary implementation in which image color tone is enhanced in based on a color tone map for a set of images.

Referring to FIG. 2, learning image enhancement procedures are discussed. An image may be captured 202 by an input device. For instance, a light sensitive detector included in a webcam captures 202 a video image including a facial region. The procedure may edit a previously obtained image stored in memory, on computer readable media, and so on.

The facial region may be detected 204 by using shape detection, identifying facial features, identifying skin tones, and so on. A color tone map may be generated 206 by examining the facial region included in an image. For images having multiple facial regions, a dominating facial region may be considered or various analysis techniques may be applied to accommodate the multiple facial regions.

Generating 206 a color tone map may occur on a per pixel basis. For example, a vector including the mean and standard deviation may be determined for the facial region pixels. In implementations, the vector may include the mean and standard deviation for the color channels constituting the pixel. Thus, for a three color channel system (such as a RGB), the determined vector may account for the mean and standard deviation for the three colors forming the pixel. While a three color channel map including red, green and blue channels is discussed, other color channels and combination of color channels are available.

The generated color tone map may be normalized 208 to a color tone map for a set of training images. For example, normalization 208 may include determining a mapping function so that the color tone map for the facial region of the obtained image matches a color tone map for the training images. For example, the mapping function may be applied to each pixel of the original image so that the in-question image color statistics within the facial region are matched to the target mean and deviation vector for the set training images. Training images may be selected to represent a cross-section of skin tones and based on image quality. Idealized training images may include carefully controlled lighting and so on, so that the image is an optimized representation of the subject. Thus, idealized training images may be generally accurate representations of the subject or human model. For example, lighting may be carefully controlled so that the training image is not pale.

In implementations, a color tone map for a set of training images may be generated by determining the mean and standard deviation for the pixels in the facial region for the individual images included in the training set, as discussed above for determining a color tone map (i.e., a target map 112) for the set of training images.

In this fashion, the generated image color tone map may be normalized to the color tone map for the training images as discussed previously with respect to the above systems. For example, normalization 208 may include deriving a color tone mapping function so that the image color tone map in the facial region matches the target color tone map (i.e., the target distribution for the set of training images). This may be done on a per color channel basis. The normalized color tone map may be stored as a lookup table which is used for subsequent images or frames. For example, the normalized color tone map is used until room lighting varies beyond a set threshold or level (varies beyond an accumulated mean by and amount larger than a predetermined threshold).

The normalized color tone map may be applied 210 to the image which may be output 212 to a display, printed, stored or so on. For example, the mapping function is applied to the facial and non-facial regions of the in-question image so that the distribution statistics match that of the training set color map.

A color tone map may be updated 214 based on the history of the mean of the average intensity for non-facial region(s). For example, if the intensity has changed, the procedure may be updated by generating a "new" image map 206. If the intensity has not changed, the present normalized may be applied 210. For an image sequence, e.g., a series of frames, the normalized color tone map may be applied 210 until the average intensity in the non-facial region(s) differs from the mean of the average intensity in the frame history.

Figure 3:
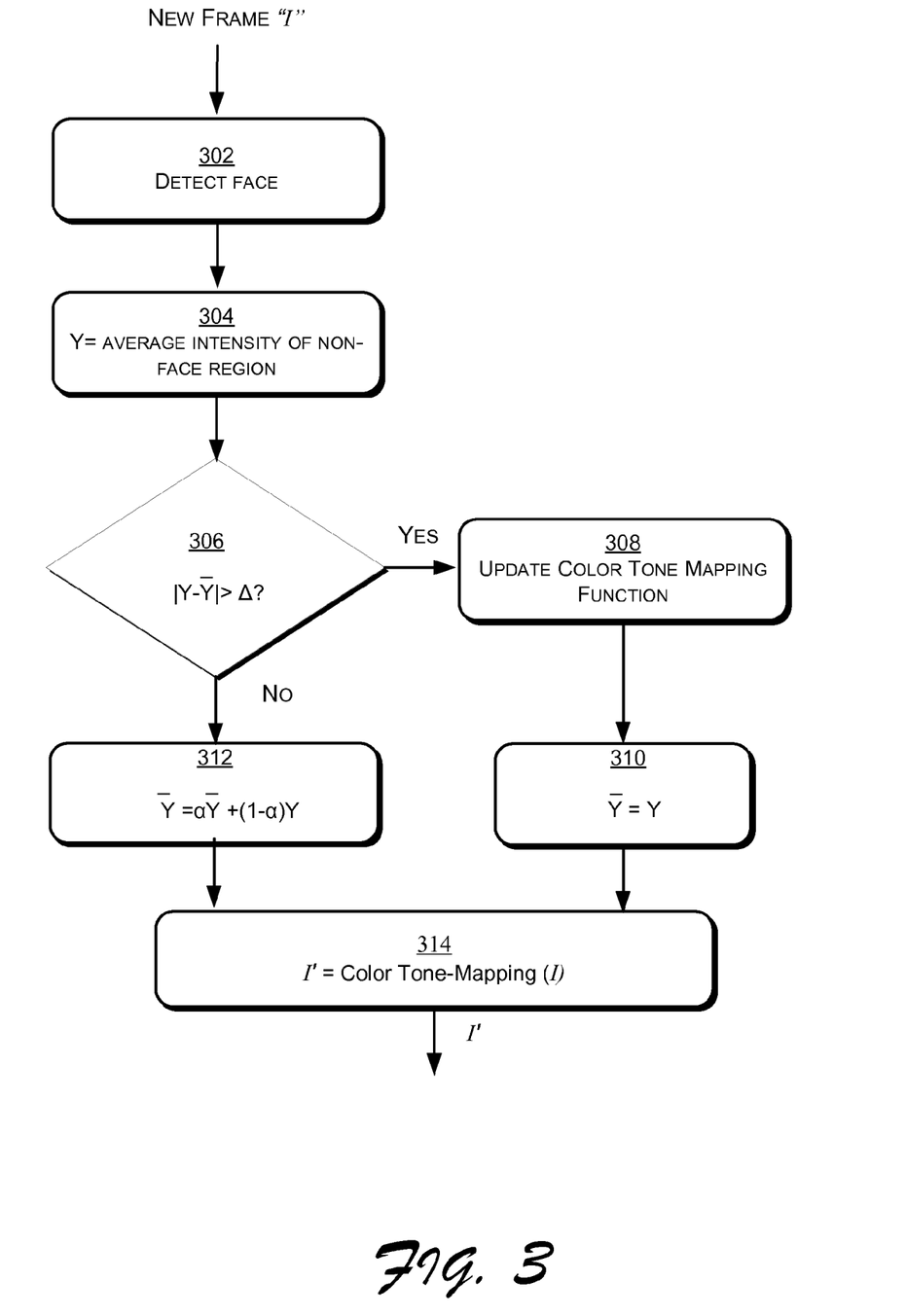
FIG. 3 is a flow diagram depicting a procedure in an exemplary implementation in which image intensity detection is implemented for initiating color tone mapping.

Referring to FIG. 3, thus, for a new frame "I" (such as may be included in a video sequence) the face region is detected 302 or determined. The average intensity of the non-face region is obtained 304. For example, "Y" is the average intensity (in a non facial region). If the average intensity in the non-facial region differs from the accumulated mean of the frames "$\overline{Y}$" by an amount greater than a threshold "Δ" the color tone mapping function may be updated 308. The accumulated mean of the frames "$\overline{Y}$" is set to the average intensity in a non facial region "Y" of the current frame 310. If the average intensity in the non-facial region does not differ from the accumulated mean of the frames "$\overline{Y}$" by an amount greater than a threshold "Δ" the previous color tone mapping function may be applied 312. "Δ" is the defined threshold (a user may define). The accumulated mean of the intensity in the non facial region of the frames in the history "$\overline{Y}$" may be updated by the average intensity "Y" of the current frame, and "α" is an update parameter which defines how quickly "$\overline{Y}$" is updated. Thus, the desired color tone map may be applied to the "new" frame and produce an enhanced frame "I'" (I "prime") 314. For example, the previous color tone map may be applied if the environmental conditions remain generally similar or the "new" color tone map may be applied to the "new" frame.

Figure 4:
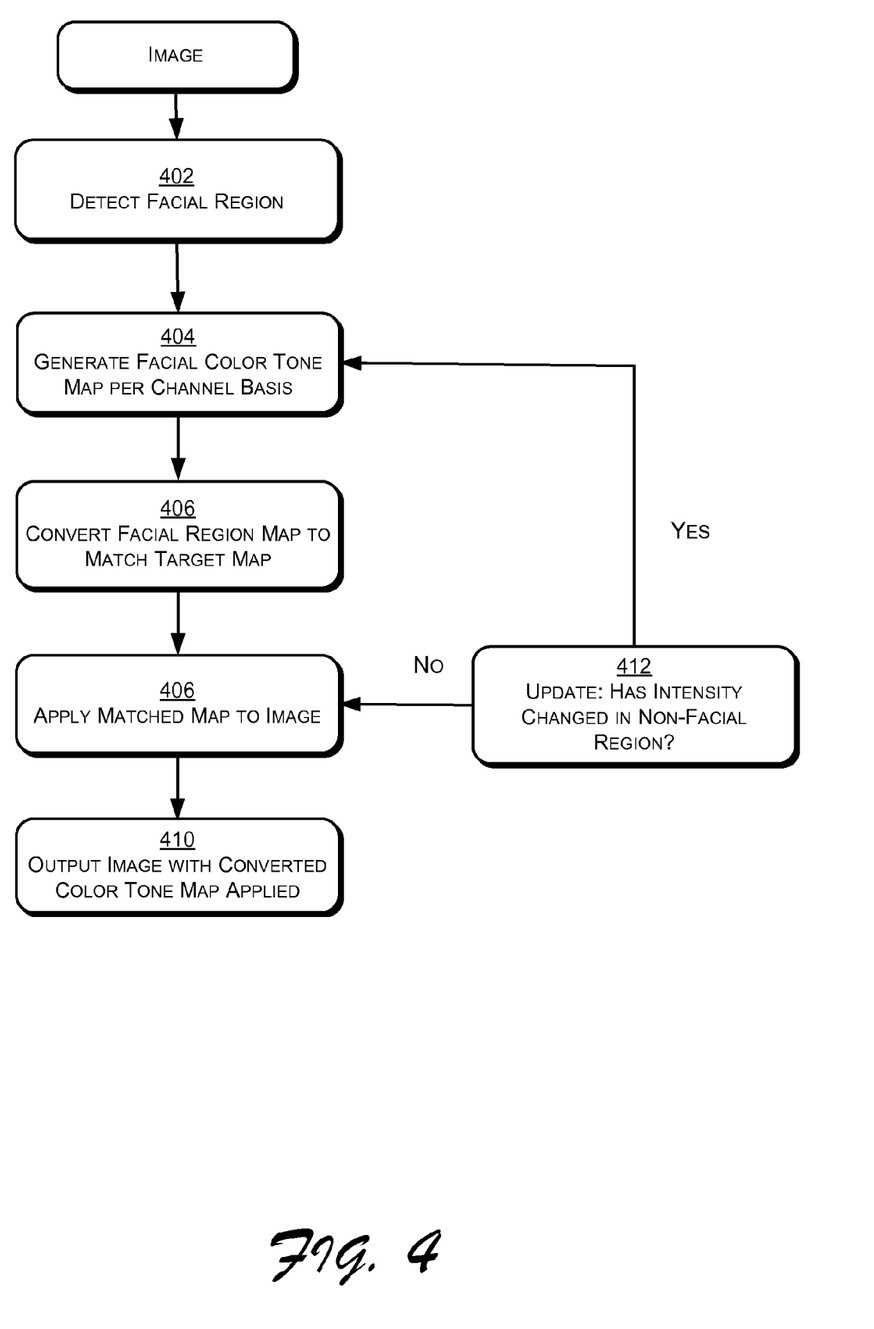
FIG. 4 is a flow diagram depicting a procedure in an exemplary implementation in which in which image color tone is enhanced in based on a target color tone map.

Referring to FIG. 4, learning image enhancement procedures are discussed. In much the same fashion as the procedures and systems discussed above, an image may be obtained from an input device, while in other instances the image is obtained from an image file including a still image, a video image, or so on. For example, the procedure may edit a previously obtained image stored in memory, on computer readable media, and so on.

The facial region may be determined 402 by using shape detection, identifying facial features, identifying skin tones, and so on. For example, a facial region may be detected by identifying a generally oval shape and facial features.

A color tone map may be generated 404 for the determined facial region. Generating 404 a color tone map may occur on a per pixel basis for the color channels forming the pixel. For example, a vector, including the mean and standard deviation, may be determined for facial region on a per pixel basis. The vector may be determined for the color channels forming the pixel. For example, the vector includes the mean and standard deviation for the color channels constituting the pixel with respect to the pixels forming the facial region. Thus, for a three color channel system (such as a RGB), the determined vector may account for the mean and standard deviation for the three color channels forming the pixel. While a three color channel map including red, green and blue channels is discussed, other color channels and combination of color channels are available.

The generated facial region color tone map may be converted 406 to a target color tone map for a set of training images so that the mean and standard deviation vector for the pixel is converted to match the target color tone map mean and standard deviation vector for a set of training images. For example, conversion 406 may include determining a mapping function so that the color tone map for the obtained image facial region matches a target color tone map for the training images. For example, the generated facial color tone map may be converted by applying a mapping function as discussed above with respect the system and procedures. Thus, the generated facial region color tone map may be converted to match a target color tone map for a set of training images. For example, the mapping function is applied to each pixel of the original image so that the in-question image color statistics within the facial region (e.g., means and standard deviation for the relevant color channels) are matched to the target mean and deviation vector for the target color tone map.

A target color tone map may represent a cross-section of skin tones while the images are selected to accurately reflect the model. Additionally, the target color tone map may use images including carefully controlled lighting and so on, so that the image is generally optimized for the subject. For example, lighting may be carefully controlled to generate a training image which is not pale or a distorted skin tone.

The converted color tone map may be applied 408 for image output 410. For example, the mapping function is applied to the facial and non-facial regions of the in-question image so that the distribution statistics matches that of the target color map. Output 410 may include providing the image to a display screen, storing the enhanced image and so on as desired.

For video sequence images, the procedure discussed herein may be updated in a manner similar to that discussed with respect to FIG. 3. Thus, a converted color tone map may be updated based on the history of the mean of the average intensity for non-facial region(s). For example, a color tone map may be updated due a lighting change and so on which results in an intensity change in a non-facial region beyond a designated threshold in comparison to an accumulated intensity change mean 412. Thus, a subsequent color map may be generated when a color change occurs in a non-facial region of a subsequent image in comparison to an accumulate intensity change mean. For example, a wall's color intensity varies due to a lighting change.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method performed by one or more processors configured with computer readable instructions, the method comprising:
   receiving an image sequence, the image sequence including an image and a subsequent image;
   generating an image color tone map for a facial region included in the image;
   obtaining a set of training images;
   classifying the set of training images into multiple clusters of images;
   finding a cluster of images from the multiple clusters of images, the cluster of images being a target for color tone mapping of the image color tone map;
   normalizing the image color tone map to a color tone map for the cluster of images;
   applying the normalized color tone map to the image; and
   applying the normalized color tone map to the subsequent image until an average intensity in a non-facial region of the subsequent image differs from a mean of an average intensity in the image sequence by a threshold amount.

2. The method as described in claim 1, further comprising performing the method on the subsequent image when an average color intensity of the subsequent image differs from an accumulated intensity mean by an amount greater than a designated threshold.

3. The method as described in claim 1, wherein the image is a video image.

4. The method as described in claim 1, wherein the normalized color tone map is applied on a three color channel basis.

5. The method as described in claim 4, wherein the three channels are red, green, blue (RGB).

6. The method as described in claim 1, further comprising storing the normalized color tone map in a lookup table.

7. The method as described in claim 1, wherein normalizing includes
   implementing a target mean and target standard deviation vector for the set of training images; and
   converting the image color tone map to match the implemented target mean and target standard deviation vector for each color channel forming the image.

8. The method as described in claim 7, wherein the target mean and target standard deviation vector is obtained by:
   determining a facial region vector $(v_i)$, for individual images included in the set of training images, including the mean (m) and standard deviation ($\sigma$) of three color channels (respectively, 1, 2, 3) in the facial region according to the formula:

$$v_i = (m_1^i, m_2^i, m_3^i, \sigma_1^i, \sigma_2^i, \sigma_3^i)^T$$

wherein the distribution of the vectors $\{v_i\} 1 \leq i \leq n$ is a mix of Gaussian mixture models for the facial region in which "n" is the number of images in the set of training images, "T" indicates the vector is transposed;
   determining distances, $D_i(v)$, between each vector $v_i$, $1 \leq i \leq n$, in the set of training images and an individual image facial region vector (v) $v = (m_1, m_2, m_3, \sigma_1, \sigma_2, \sigma_3)^T$, for the individual image, wherein the mean (m) and standard deviation ($\sigma$) of three color channels (respectively, 1, 2, 3) in the individual image facial region vector;
   assigning the vector $v_i$, whose distance $D_i(v)$ is the smallest, as the target mean and target standard deviation for the set of training images.

9. The method as described in claim 7, wherein the target mean and target standard deviation vector is obtained by:
   determining a facial region vector $(v_i)$, for individual images included in the set of training images, including the mean (m) and standard deviation ($\sigma$) of three color channels (respectively, 1, 2, 3) in the facial region according to the formula:

$$v_i = (m_1^i, m_2^i, m_3^i, \sigma_1^i, \sigma_2^i, \sigma_3^i)^T$$

wherein the distribution of the vectors $\{v_i\} 1 \leq i \leq n$ is a mix of Gaussian mixture models for the facial region in which "n" is the number of images in the set of training images, "T" indicates the vector is transposed;
   dividing the vectors $\{v_i\} 1 \leq i \leq n$ into M clusters with each cluster j containing similar vectors, the center of which being denoted by $\bar{v}_j = (\bar{m}_1^j, \bar{m}_2^j, \bar{m}_3^j, \bar{\sigma}_1^j, \bar{\sigma}_2^j, \bar{\sigma}_3^j)^T$
   determining the distances, $D_j(v)$, between each vector $v_j$, $1 \leq j \leq M$, in the set of training clusters and an individual image facial region vector (v) $v = (m_1, m_2, m_3, \sigma_1, \sigma_2, \sigma_3)^T$, for the individual image, wherein the mean (m) and standard deviation ($\sigma$) of three color channels (respectively, 1, 2, 3) in the individual image facial region vector;
   assigning the vector $v_j$, whose distance $D_j(v)$ is the smallest, as the target mean and target standard deviation for the set of training images.

10. The method as described in claim 7, wherein converting comprises:
    determining a desired tone mapping function to be applied to the image color tone map wherein the mapping function is in accordance with the function:

$$y = f_c(x)$$

for a three color channel system in which c, c=1, 2, 3, wherein mapping an average intensity from $m_c$ to $\bar{m}_c$, in which $f_c(x)$ satisfies the function:

$$f_c(m_c) = \bar{m}_c$$

such that, the image color tone map matches the obtained target mean distribution; and matching the image color tone map standard deviation to the obtained target standard deviation, according to the function:

$$f'_c(m_c) = \frac{\overline{\sigma_c}}{\sigma_c}$$

in which the derivative at $m_c$ is equal to $$\frac{\overline{\sigma_c}}{\sigma_c}$$

wherein "$\overline{\sigma_c}$" is the average standard deviation for an individual color channel included in the three color channels and "$\sigma_c$" is the standard deviation for the individual color channel included in three color channels.

11. The method as described in claim 1, wherein the image is a still image.

12. One or more memory devices comprising computer-executable instructions that, when executed, direct a computing system to:
receive an image sequence, the image sequence including an image and a subsequent image;
obtain a set of training images;
classify the set of training images into multiple clusters of images;
find a cluster of images, from the multiple clusters of images, as a target for color tone mapping;
generate a facial color tone map on a per color channel basis including a mean and standard deviation vector, for the image;
convert the facial color tone map to match a mean and standard deviation vector of a target color tone map derived from the cluster of images;
output the image with the converted color tone map applied to the image; and
update an output to the subsequent image when an average intensity in a non-facial region of the subsequent image differs from a mean of an average intensity in the image sequence by a threshold amount.

13. The one or more memory devices as described in claim 12, wherein the target mean and standard deviation vector are generated by:
determining a facial region vector ($v_i$), for individual images included in a set of training images, including the mean (m) and standard deviation ($\sigma$) of three color channels (respectively, 1, 2, 3) in the facial region according to the formula:

$$v_i = (m_1^i, m_2^i, m_3^i, \sigma_1^i, \sigma_2^i, \sigma_3^i)^T$$

wherein the distribution of the vectors $\{v_i\} 1 \leq i \leq n$ is a mix of Gaussian mixture models for the facial region in which "n" is the number of images in the set of training images, "T" indicates the vector is transposed;
determining distances, $D_i(v)$, between each vector $v_i$, $1 \leq i \leq n$, in the set of training images and an individual image facial region vector (v) $v=(m_1, m_2, m_3, \sigma_1, \sigma_2, \sigma_3)^T$, for the individual image, wherein the mean (m) and standard deviation ($\sigma$) of three color channels (respectively, 1, 2, 3) in the individual image facial region vector;
assigning the vector $v_i$, whose distance $D_i(v)$ is the smallest, as the target mean and target standard deviation for the set of training images.

14. The one or more memory devices as described in claim 12, wherein the target mean and standard deviation vector are generated by:
determining a facial region vector ($v_i$), for individual images included in the set of training images, including the mean (m) and standard deviation ($\sigma$) of three color channels (respectively, 1, 2, 3) in the facial region according to the formula:

$$v_i = (m_1^i, m_2^i, m_3^i, \sigma_1^i, \sigma_2^i, \sigma_3^i)^T$$

wherein the distribution of the vectors $\{v_i\} 1 \leq i \leq n$ is a mix of Gaussian mixture models for the facial region in which "n" is the number of images in the set of training images, "T" indicates the vector is transposed;
dividing the vectors $\{v_i\} 1 \leq i \leq n$ into M clusters with each cluster j containing similar vectors, the center of which being denoted by $\overline{v}_j = (\overline{m}_1^j, \overline{m}_2^j, \overline{m}_3^j, \overline{\sigma}_1^j, \overline{\sigma}_2^j, \overline{\sigma}_3^j)^T$;
determining the distances, $D_j(v)$, between each vector $v_j$, $1 \leq j \leq M$, in the set of training clusters and an individual image facial region vector (v) $v=(m_1, m_2, m_3, \sigma_1, \sigma_2, \sigma_3)^T$, for the individual image, wherein the mean (m) and standard deviation ($\sigma$) of three color channels (respectively, 1, 2, 3) in the individual image facial region vector; and
assigning the vector $v_j$, whose distance $D_j(v)$ is the smallest, as the target mean and target standard deviation for the set of training images.

15. The one or more memory devices as described in claim 12, wherein converting includes:
determining a desired tone mapping function to be applied to the facial color tone map wherein the mapping function is in accordance with the function:

$$y = f_c(x)$$

for a three color channel system in which c, c=1, 2, 3, wherein mapping an average intensity from $m_c$ to $\overline{m}_c$, in which $f_c(x)$ satisfies the function:

$$f_c(m_c) = \overline{m}_c$$

such that, the facial color tone map matches the obtained target mean distribution; and
matching the facial color tone map standard deviation to the obtained target standard deviation, according to the function:

$$f'_c(m_c) = \frac{\overline{\sigma_c}}{\sigma_c}$$

in which the derivative at $m_c$ is equal to $$\frac{\overline{\sigma_c}}{\sigma_c}$$

wherein "$\overline{\sigma_c}$" is the average standard deviation for an individual color channel included in the three color channels and "$\sigma_c$" is the standard deviation for the individual color channel included in three color channels.

16. The one or more memory devices as described in claim 12, further comprising updating the output when an average color intensity of the subsequent image differs from an accumulated color intensity mean by an amount greater than a designated threshold.

17. A system comprising:
one or more processors;
memory communicatively coupled to the one or more processors, the memory having stored instructions that, when executed at the system, configure the system to implement:
  a color tone enhancement module that performs multiple operations comprising:
    classifying a set of training images into multiple clusters of images;
    finding a cluster of images, from the multiple clusters of images, as a target for color tone mapping;
    enhancing image color tone by normalizing color tone occurring within an original image, including a facial region, to match a distribution of a target color tone map of the cluster of images; and
    updating a color tone map obtained from the original image based on a history of a mean of an average intensity for non-facial regions.

18. The system as described in claim 17, wherein the color tone enhancement module is included in a video camera configured to obtain the original image.

19. The system as described in claim 17, wherein the color tone enhancement module is included in a computer configured to receive images from a video camera.

20. The system as described in claim 17, wherein subsequent images are enhanced when an average color intensity of the subsequent images differs from an accumulated color intensity mean by an amount greater than a designated threshold.

* * * * *